United States Patent [19]
Carbone et al.

[11] 3,744,835
[45] July 10, 1973

[54] SHOCK ABSORBING HONEYCOMB BUMPER

[75] Inventors: Angelo F. Carbone, Brooklyn, N.Y.; Clinton F. Egerton, Stamford, Conn.; Emmanuele Fellacaro, Commack, N.Y.

[73] Assignee: Angelo F. Carbone, Clinton F. Egerton and Emmanuele Fallacaro, a part interest to each

[22] Filed: Nov. 26, 1971

[21] Appl. No.: 202,281

[52] U.S. Cl........................ 293/1, 52/616, 188/1 C, 293/60, 293/71 R, 296/28 R, 296/31 P
[51] Int. Cl..... B60r 19/04, B60r 27/00, B61f 19/04
[58] Field of Search.................. 188/88, 1 C; 293/1, 293/60, 63, 71 P, 70, 71 R; 52/616; 180/89, 150 B, 150 R; 296/28 R, 31 P

[56] References Cited
UNITED STATES PATENTS

| | | | |
|---|---|---|---|
| 3,493,257 | 2/1970 | Fitzgerald et al. | 293/63 |
| 3,265,163 | 8/1966 | Gilbert et al. | 188/88 |
| 3,512,822 | 5/1970 | Rich et al. | 293/1 |
| 3,082,846 | 3/1963 | Jansen et al. | 188/1 C |
| 3,506,295 | 4/1970 | Yancey | 293/70 |
| 3,514,144 | 5/1970 | Alderfer | 293/71 R |
| 3,587,787 | 6/1971 | Rich | 188/1 C |
| 3,610,609 | 10/1971 | Sobel | 293/70 |

FOREIGN PATENTS OR APPLICATIONS

| | | | |
|---|---|---|---|
| 18,213 | 9/1912 | Great Britain | 293/71 P |
| 1,923,305 | 5/1969 | Germany | 293/71 R |

Primary Examiner—Gerald M. Forlenza
Assistant Examiner—Howard Beltran
Attorney—Allison C. Collard

[57] ABSTRACT

An automobile bumper constructed from plastic, metallic or paper honeycomb material, and covered by a rubber, metal or plastic shell which may be silvered to provide a simulated chrome bumper. The bumper is shock absorbent to reduce damage to the fenders and body of the automobile during slow speed crashes.

3 Claims, 3 Drawing Figures

PATENTED JUL 10 1973 3,744,835
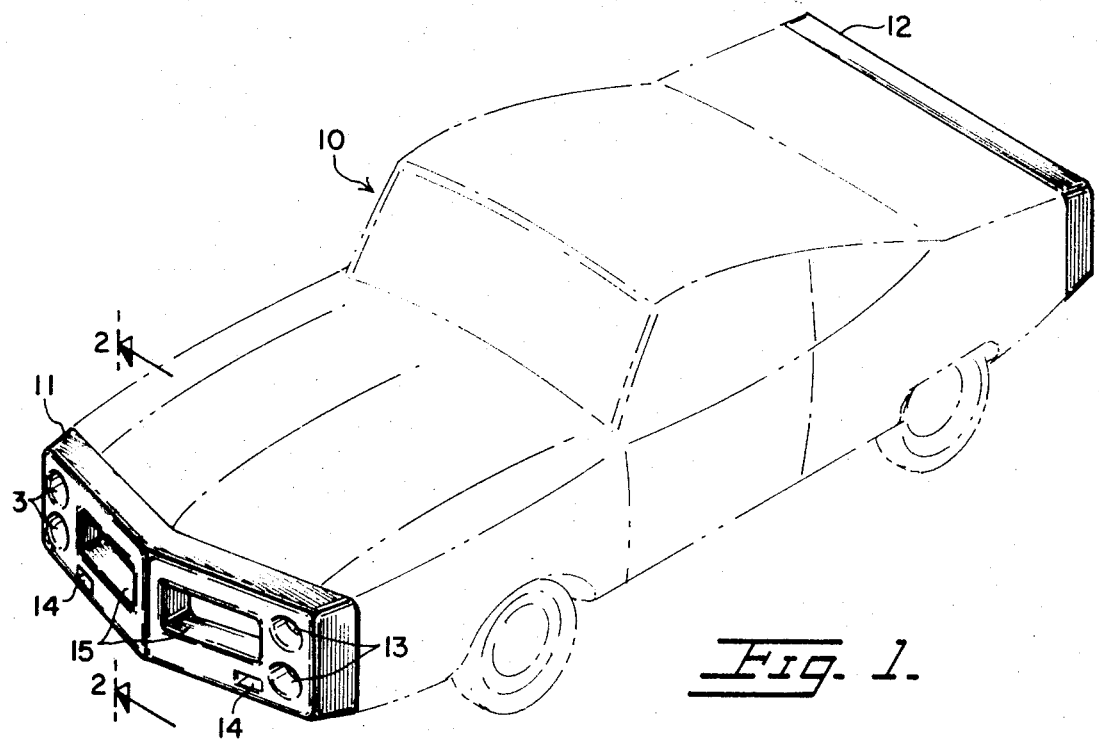
Fig. 1.
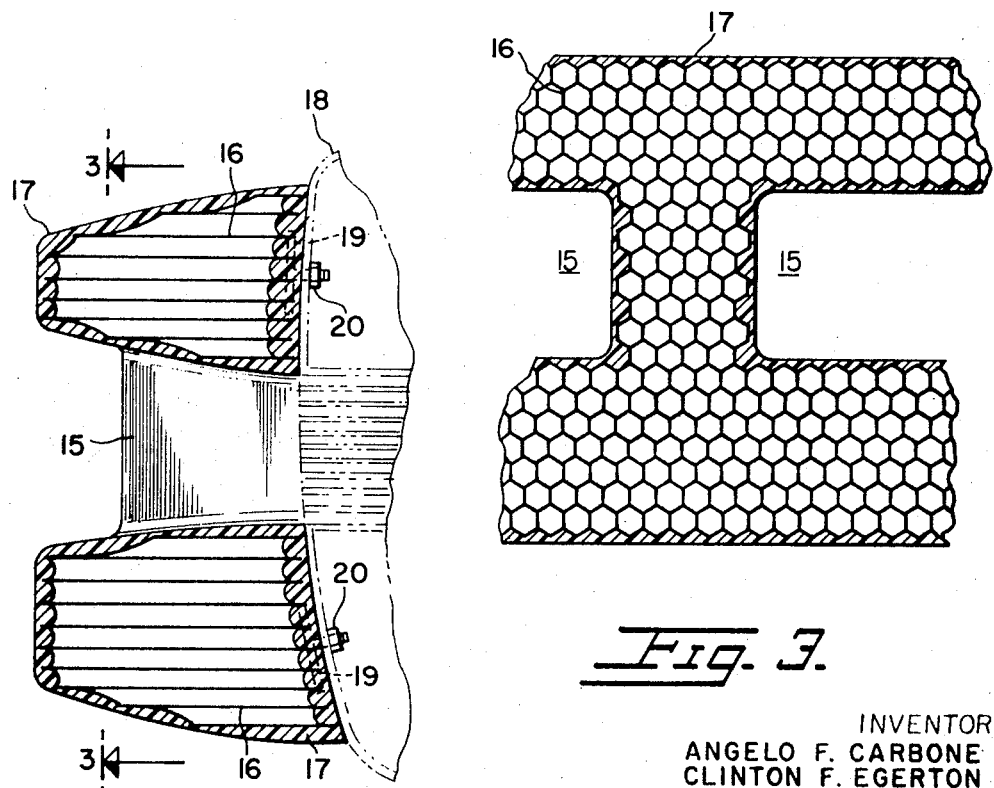
Fig. 2.
Fig. 3.
INVENTORS
ANGELO F. CARBONE
CLINTON F. EGERTON
EMMANUELE FALLACARO
BY
ATTORNEY.

SHOCK ABSORBING HONEYCOMB BUMPER

The present invention relates to automobile bumpers, and in particular, to an impact absorbing bumper comprising a plastic, metallic or paper honeycomb core covered by a metal, rubber or plastic shell, for reducing damage to body and fenders of an automobile during slow speed crashes.

In recent years, the function of automobile bumpers has been transformed from that of protecting the body and fenders of the automobile from damage during low impact and slow speed collisions, to that of a decorative ornament designed more for its style than functionality. Present bumpers are often designed flush with the fenders and body of the automobile, attached to the fenders instead of the frame of the car, and in some cases, consist merely of a pair of L-shaped bumper components attached to the front corners of the automobile. Some attempts have been made by automobile manufacturers to produce a shock absorbent bumper, comprising shock absorbent resilient material, but these bumpers have proved too expensive to be included on all automobile models. It is, therefore, preferable to provide an automobile with a shock absorbing bumper, both in front and rear, which is inexpensive to manufacture, light in weight and has high strength, to absorb impact shocks during low speed crashes between automobiles.

Accordingly, the present invention provides an impact absorbing bumper for automobiles comprising a core constructed of plastic, paper or metallic honeycomb material covered by a rubber, metal or plastic shell. The longitudinal axes of the cells of the honeycomb structure are disposed parallel to the longitudinal axis of the automobile, to provide high strength to resist collision forces. The plastic shell may be constructed of mylar, and silvered by conventional processes to simulate a chrome bumper. The bumper is capable of absorbing impacts during slow speed collisions occurring in excess of 5 miles per hour.

It is therefore an object of the present invention to provide an automobile bumper of light weight and high strength which is capable of absorbing impact shocks occurring during slow speed automobile collisions.

It is another object of the present invention to provide an automobile bumper which prevents damage to the fenders and body of the automobile during slow speed collisions.

It is a further object of the present invention to provide an impact absorbing automobile bumper which is decorative in design and simulates a conventional chrome bumper.

It is still another object of the present invention to provide a shock absorbing automobile bumper which is simple in design, easy to manufacture, and durable in operation.

Other objects and features of the present invention will become apparent from the following detailed description taken in connection with the accompanying drawings which disclose a single embodiment of the invention. It is to be understood, however, that the drawings are designed for the purpose of illustration only and are not intended as a definition of the limits and scope of the invention.

Referring to the drawings, wherein similar reference characters denote similar elements throughout the several views:

FIG. 1 is a perspective view of a shock absorbing automobile bumper constructed in accordance with the present invention shown in use on an automobile;

FIG. 2 is a cross-sectional view of the bumper taken along section 2—2 of FIG. 1; and FIG. 3 is another cross-sectional view of the bumper taken along section 3—3 of FIG. 2.

Referring to the drawings, there is shown an automobile 10 having front and rear shock absorbing bumpers 11 and 12 attached thereto. Bumper 11 has a V-shaped contour and extends substantially from the top to the bottom of the fenders of the automobile. A plurality of apertures 13 and 14 are provided for the headlights and parking lights of the automobile, and air intake openings 15 are provided for allowing adequate flow of air to the engine of the vehicle.

The bumper comprises a honeycomb core 16 constructed, for example, of hard kraft paper, plastic or metal, such as alluminum. Plastic material, such as polyvinyl chloride, urethane, or polyethelene, may be used to construct the honeycomb core. The honeycomb material has a plurality of polygonal cylinders or cells which are shown in FIG. 3, whose longitudinal axes are disposed parallel to the longitudinal axis of the car so that sufficient strength to resist impacts during collisions is provided. Although the cells are hexagonal shaped, any other suitable geometric shape may be used. The honeycomb core is covered by a rubber, metal or plastic shell 17 which may be, for example, mylar material. The plastic shell may also be silvered using conventional methods to produce a simulated conventional chrome bumper. The bumper is attached to the vehicle by a pair of T-bolts 19 which are fastened by nuts 20 on fender 18.

It should be noted that the honeycomb core may be used alone without the metal, rubber or plastic shell as a bumper. The shell gives the core a smooth finish and permits it to be styled, and adds strength to the core material, but it is not absolutely necessary.

The honeycomb material is manufactured by any suitable conventional process during which it is produced in planar form. To form the core, the planar material is expanded to its three-dimensional form shown in FIG. 3. The honeycomb, once expanded, has no "memory," that is, there are no forces present in the core inducing it to fold back to its planar form. Hence, the shell is not absolutely necessary. However, the core does have a "memory" as far as its three-dimensional form is concerned, and the cells will return to their original extended longitudinal configuration, over a period of time, after a collision.

The bumper of the present invention is light weight, yet has extremely high strength and good impact absorption because of the use of the honeycomb core. The honeycomb material is easily styled and cut, especially in its planar form, to any desired configuration, and is extremely inexpensive to manufacture, costing a fraction of the cost of conventional metal bumpers. The bumper of the present invention will also absorb collision impacts of up to 10 miles an hour without causing damage to the vehicle, a significant improvement over conventional automobile bumpers.

While only a single embodiment of the present invention has been shown and described, it will be obvious to those persons skilled in the art that many changes and modifications may be made thereunto without departing from the spirit and scope of the invention.

We claim:

1. A shock-absorbing bumper for mounting on a rigid planar surface disposed substantially across the width on at least one end of a vehicle comprising:

a resilient shock absorbing honeycomb member having honeycomb cells of polygonal cross-sectional shape, wherein adjacent cells have at least one contiguous wall and the longitudinal axes of said cells are disposed substantially parallel to the direction of travel of said vehicle, said honeycomb member having a width approximating that of the planar mounting surface, said honeycomb member having a cell depth greater than the width of an individual cell, said cells having a memory to return to their extended longitudinal configuration after impact;

mounting means for securing said resilient honeycomb member to the planar mounting surface, the back of said honeycomb member having a substantial area for disposal across the surface of the planar surface for absorbing shock across the width of the vehicle; and an outer shell encasing said resilient honeycomb member to provide a smooth exterior surface and to simulate a conventional bumper.

2. The bumper as recited in claim 1, wherein said resilient member and said outer shell are molded so as to form the front or rear portion of the automobile, and include recesses for receiving the automobile lamps and grille, the dimensions of said rigid shock-absorbing member and said outer shell being substantially the same as the dimensions of the front or rear portion of the automobile to which the bumper is affixed.

3. The bumper as recited in claim 1, wherein said outer shell disposed about said honeycomb member is plastic member, and wherein said honeycomb material is constructed of plastic.

* * * * *